(12) United States Patent
Eiriksson et al.

(10) Patent No.: US 12,012,287 B2
(45) Date of Patent: Jun. 18, 2024

(54) TENSION MECHANISM FOR BELT-TYPE TRIBOELECTRIC SEPARATOR DEVICES

(71) Applicant: SEPARATION TECHNOLOGIES LLC, Needham, MA (US)

(72) Inventors: Ari Eiriksson, South Hamilton, MA (US); Jose L. Rivera-Ortiz, Framingham, MA (US)

(73) Assignee: SEPARATION TECHNOLOGIES LLC, Needham, MA (US)

( * ) Notice: Subject to any disclaimer, the term of this patent is extended or adjusted under 35 U.S.C. 154(b) by 161 days.

(21) Appl. No.: 17/602,256

(22) PCT Filed: Apr. 3, 2020

(86) PCT No.: PCT/US2020/026560
§ 371 (c)(1),
(2) Date: Oct. 7, 2021

(87) PCT Pub. No.: WO2020/210121
PCT Pub. Date: Oct. 15, 2020

(65) Prior Publication Data
US 2022/0162008 A1    May 26, 2022

Related U.S. Application Data

(60) Provisional application No. 62/831,329, filed on Apr. 9, 2019.

(51) Int. Cl.
*B65G 23/44*   (2006.01)
*B03C 7/00*    (2006.01)
*B03C 7/08*    (2006.01)

(52) U.S. Cl.
CPC .............. *B65G 23/44* (2013.01); *B03C 7/006* (2013.01); *B03C 7/08* (2013.01)

(58) Field of Classification Search
CPC ............ B65G 23/44; B03C 7/006; B03C 7/08
See application file for complete search history.

(56) References Cited

U.S. PATENT DOCUMENTS

| | | | | |
|---|---|---|---|---|
| 4,089,407 | A * | 5/1978 | Bullivant | B65G 23/44 198/815 |
| 4,839,032 | A | 6/1989 | Whitlock | |
| 4,874,507 | A * | 10/1989 | Whitlock | B03C 5/02 209/127.1 |
| 5,934,449 | A | 8/1999 | Dolan | |
| 5,947,264 | A * | 9/1999 | Eltvedt | B65G 21/105 198/816 |
| 6,516,941 | B1 * | 2/2003 | Buhne | B65G 23/44 198/813 |
| 6,796,419 | B2 * | 9/2004 | Sousek | F16H 7/1209 198/813 |

(Continued)

FOREIGN PATENT DOCUMENTS

| CL | 2015002496 A1 | 7/2016 |
|---|---|---|
| CL | 2016002650 U1 | 7/2017 |

(Continued)

*Primary Examiner* — Patrick H Mackey

(57) ABSTRACT

An improved belt separator system and an improved method to separate particle mixtures based on triboelectric separation of particles is disclosed. The separator system includes a tensioning system embodying a tension roller and a two-part rotating shaft assembly.

16 Claims, 6 Drawing Sheets

(56) References Cited

U.S. PATENT DOCUMENTS 11,021,329 B2 *  6/2021  Howard ................. B65G 23/44

FOREIGN PATENT DOCUMENTS

| | | | | |
|---|---|---|---|---|
| DE | 4439889 | C1 | 8/1996 | |
| EM | 1186556 | A1 | 3/2002 | |
| EP | 0121921 | A1 | 10/1984 | |
| EP | 0524176 | A1 | 1/1993 | |
| EP | 1418139 | A1 * | 5/2004 | ............. B65G 23/12 |
| EP | 1418139 | A1 | 5/2004 | |
| JP | 4209470 | B2 * | 1/2009 | ............... B03C 7/08 |

* cited by examiner

TENSION MECHANISM FOR BELT-TYPE TRIBOELECTRIC SEPARATOR DEVICES

CROSS-REFERENCE TO RELATED APPLICATIONS

This application is a U.S. National Phase Application, and claims the benefit of priority under 35 U.S.C. § 371, of International (PCT) Patent Application Serial No. PCT/US2020/026560, filed on Apr. 3, 2020, which claims the benefit of priority to U.S. Provisional Patent Application Ser. No. 62/831,329 filed Apr. 9, 2019, titled "TENSION MECHANISM FOR BELT-TYPE TRIBOELECTRIC SEPARATOR DEVICES," the entire disclosure of which is hereby incorporated herein by reference in its entirety for all purposes.

BACKGROUND OF THE DISCLOSURE

Field of Invention

The present invention relates to a tensioning mechanism for a belt-type triboelectric separator system, for example, to provide for triboelectric charging and subsequent triboelectric separation of the particles with the belt separation apparatus.

Discussion of Related Art

Belt separator systems (BSS) are used to separate the constituents of particle mixtures based on the charging of the different constituents by surface contact (i.e., the triboelectric effect). FIG. 1 shows a belt separator system such as is disclosed in commonly-owned U.S. Pat. Nos. 4,839,032 and 4,874,507, which are hereby incorporated by reference in their entirety. One embodiment of belt separator system includes parallel spaced-apart electrodes 10 and 12 arranged in a longitudinal direction to define a process chamber 14 having a longitudinal centerline 16, and a belt 18 traveling in the longitudinal direction between the spaced-apart electrodes, parallel to the longitudinal centerline. The belt 18 forms a continuous loop which is driven by a pair of end rollers 20, 22. A particle mixture is loaded onto the belt 18 at a feed area 11 between electrodes 10. Belt 18 includes counter-current traveling belt segments 18A and 18B moving in opposite directions for transporting the constituents of the particle mixture along the lengths of the electrodes 10 and 12. The only moving part of the BSS is the belt 18, which moves at a high speed, for example, about 40 miles an hour, in an extremely abrasive environment. The two belt segments 18A, 18B move in opposite directions, parallel to centerline 16.

In one embodiment, a negative voltage is applied to the upper electrodes 10 and positive voltage to the lower electrode 12, causing feed particles with positive charge to be pulled towards the negative upper electrodes and feed particles with negative charge to be drawn in the opposite direction. As the upper belt segment 18A sweeps to the right and the lower belt segment 18B sweeps to the left, the material exiting the process chamber 14 on the right will be enriched with positively charged particles while the material exiting on the left will be enriched with negatively charged particles.

As an example, fly ash containing a mix of carbon and silica particles can be introduced in the process chamber 14, and the agitation of particle-particle, particle-belt and particle-wall collisions in the strong electric field, coupled with the movement of the belt 18, will result in one output stream becoming enriched in carbon and the other output stream enriched in silica as compared to the original feed.

In one known embodiment, the belt 18 shown in FIG. 1 has four rollers, two drive rollers 20 and 22, and two idler rollers 20A and 22A. For this basic configuration, belt tensioning was accomplished using linear actuator(s) connected to drive rollers that move drive roller along the same axis as the belt motion. In another known embodiment, two additional idler rollers, referred to as tension rollers, can be moved to maintain tension in the belt loop even with substantial elongation of the belt. FIG. 2 illustrates the belt 18 and the tension rollers 24, 26. The two additional tension rollers 24, 26 are the uppermost rollers, and the tension mechanism moves these two rollers in a rotary motion to tension the belt 18.

The belt 18 requires tension at all times during material processing so it does not slip at the two drive rollers 20, 22, so a pre-tension is applied. The drag forces generated in the belt 18 (particularly inside the process chamber 14) add additional tension to the belt in certain segments of the belt loop. The current production belts are made from a plastic material, which sees substantial elongation over several hundred hours of run time due to the belt tension. The current system can accommodate approximately 20 inches of belt elongation on each side of the belt, for a total elongation of roughly 40 inches.

Referring additionally to FIG. 3, in a known embodiment, each tension roller 24, 26 is mounted on two rotating disks, the nearside rotating disk indicated at 28 in FIG. 3, which currently require an elaborate tensioning mechanism to ensure that both rotating disks rotate by the same amount to avoid misalignment of the tension roller relative to the belt 18. If the tension rollers get out of alignment, the belt 18 will not track properly and can run up against one side wall of the process chamber 14. This tensioning mechanism to couple the rotating disk movement is shown in FIG. 3.

SUMMARY OF THE DISCLOSURE

Aspects and embodiments are directed to a system to deliver a tensioning mechanism for a belt-type triboelectric separator system.

One aspect of the present disclosure is directed to a tensioning mechanism to tension an endless belt. In one embodiment, the tensioning mechanism comprises a tension roller configured to apply tension to a belt, a pair of rotating disks coupled to the tension roller at respective ends of the tension roller, the pair of rotating disks being configured to move the tension roller to apply tension to the belt, and a rotating shaft assembly coupled to the pair of rotating disks. The rotating shaft assembly includes an inner shaft coupled to an outer shaft. The inner shaft is rotated with an actuator. The outer shaft is sized to receive the inner shaft therein and is coupled to the pair of rotating disks. The rotating shaft assembly is configured so both rotating disks of the pair of rotating disks experience approximately the same angular deflection relative to the outer end of the inner shaft when each disk exerts equal amount of torque on the rotating shaft assembly against the opposing torque exerted by an actuator on the inner shaft.

Embodiments of the tensioning mechanism further may include holding the pair of rotating disks coaxial to the rotating shaft assembly by bearings on perimeters of the pair of rotating disks. One rotating disk of the pair of rotating disks may be configured to be detached from both the tension roller and the rotating shaft assembly, and to be moved away so the belt can be removed off the tension roller and other rollers defining a belt loop without removing the belt rollers. The pair of rotating disks may serve as part of an enclosure. The rotating shaft assembly may be locked to the pair of rotating disks during belt operation, such that the rotating shaft assembly holds the pair of rotating disks together in the event of an explosion inside the enclosure or other event which generates separating axial forces on the rotating members. The tensioning mechanism may be included within a belt separator system comprising a first set of two rollers at a first end of the belt separator system and a second set of two rollers at a second end of the belt separator system, wherein the first set of two rollers does not include a tension roller and the second set of two rollers includes a tension roller. A drive roller on the first side may be operated at substantially greater applied motor torque than a drive roller on second side so that the applied motor torque on each roller is approximately proportional to the length of roller circumference in firm contact with the belt. The outer end of the inner shaft may be held coaxial to the closer end of the outer shaft by a bearing structure capable of resisting radial loads. The bearing structure may consist of three or more cam followers. In another embodiment, instead of containing two rotating disks, the mechanism may have two arms mounted to the outer rotating shaft, with each arm being connected to one end of the tension roller so that both arms experience the same angular deflection as defined by a plane through the center of the tension roller at the end of the arm and the axis of the outer rotating shaft under equal loads from the tension roller relative to the inner shaft, the outer rotating shaft being held by bearings on both ends, which constrain lateral motion but allow rotation of the outer rotating shaft on its axis. One arm can be detached from the tension roller so that the continuous belt can be removed from the tension roller without removing the tension roller.

Another aspect of the present disclosure is directed to a belt separator system comprising a first electrode and a second electrode arranged on opposite sides of a longitudinal centerline and configured to provide an electric field between the first and second electrodes, a first set of rollers disposed at a first end of the system, a second set of rollers disposed at a second end of the system, a continuous belt disposed between the first and second electrodes and supported by the first set of rollers and the second set of rollers, a separation zone defined by and between the continuous belt, and a tensioning mechanism to tension the continuous belt. The tensioning mechanism includes a tension roller configured to apply tension to the continuous belt and a pair of rotating disks coupled to the tension roller at respective ends of the tension roller, the pair of rotating disks being configured to move the tension roller to apply tension to the continuous belt. The tensioning mechanism further includes a rotating shaft assembly coupled to the pair of rotating disks. The rotating shaft assembly includes an inner shaft coupled to an outer shaft. The inner shaft is rotated with an actuator. The outer shaft is sized to receive the inner shaft therein and is coupled to the pair of rotating disks. The rotating shaft assembly is configured so both rotating disks of the pair of rotating disks experience approximately the same angular deflection relative to the outer end of the inner shaft when each disk exerts equal amount of torque on the rotating shaft assembly against the opposing torque exerted by an actuator on the inner shaft.

Embodiments of the belt separator system further may include holding the pair of rotating disks coaxial to the rotating shaft assembly by bearings on perimeters of the pair of rotating disks. One rotating disk of the pair of rotating disks can be detached from both the tension roller and the rotating shaft assembly, and moved away so the continuous belt can be removed off the tension roller and the first and second set of rollers defining a belt loop, without removing the rollers. The pair of rotating disks may serve as part of an enclosure. The rotating shaft assembly may be locked to the pair of rotating disks during operation, such that the rotating shaft assembly holds the pair of rotating disks together in the event of an explosion inside the enclosure or other event which generates separating axial forces on the rotating members. The first set of two rollers does not include a tension roller and the second set of two rollers includes a tension roller.

A drive roller on the first side may be operated at substantially greater applied motor torque than a drive roller on the second side so that the applied motor torque on each roller is approximately proportional to the length of roller circumference in firm contact with the continuous belt. The outer end of the inner shaft may be held coaxial to the closer end of the outer shaft by a bearing structure capable of resisting radial loads. The bearing structure may consist of three or more cam followers.

Another aspect of the present disclosure is directed to a method of fluidizing a particle mixture within a belt separator system. In one embodiment, the method comprises introducing the particle mixture to a feed port of the belt separator system. The system comprises a first electrode and a second electrode arranged on opposite sides of a longitudinal centerline and configured to provide an electric field between the first and second electrodes, a first set of rollers disposed at a first end of the system, a second set of rollers disposed at a second end of the system, a continuous belt disposed between the first and second electrodes and supported by the first set of rollers and the second set of rollers, a separation zone defined by and between the continuous belt, and a tensioning mechanism to tension the continuous belt. The tensioning mechanism includes a tension roller configured to apply tension to the continuous belt and a pair of rotating disks coupled to the tension roller at respective ends of the tension roller. The pair of rotating disks are configured to move the tension roller to apply tension to the continuous belt. The tensioning mechanism further includes a rotating shaft assembly coupled to the pair of rotating disks. The rotating shaft assembly includes an inner shaft coupled to an outer shaft. The inner shaft is rotated with an actuator. The outer shaft is sized to receive the inner shaft therein and is coupled to the pair of rotating disks. The rotating shaft assembly is configured so both rotating disks of the pair of rotating disks experience approximately the same angular deflection relative to the outer end of the inner shaft when each disk exerts equal amount of torque on the rotating shaft assembly against the opposing torque exerted by an actuator on the inner shaft. The method further comprises providing a separation influence to at least one of the first electrode and the second electrode; separating different components of the particle mixture in the direction of the separation influence according to their relative influenceability to the separation influence; mechanically moving the different components of the particle mixture transversely to the separation influence; and removing the separated components from said separation chamber. Embodiments of the method further may include holding the pair of rotating disks coaxial to the rotating shaft assembly by bearings on perimeters of the pair of rotating disks. The method further may include detaching one rotating disk of the pair of rotating disks from both the tension roller and the rotating shaft assembly, and moving the rotating disk away so that the continuous belt can be removed off the tension roller and the first and second set of rollers defining a belt loop without removing the rollers. The method further may include locking the rotating shaft assembly to the pair of rotating disks during operation, such that the rotating shaft assembly holds the pair of rotating disks together in the event of an explosion inside the enclosure or other event which generates separating axial forces on the rotating members. The method further may include providing the second set of two rollers with the tension roller. The method further may include operating a drive roller on the first side at substantially greater applied motor torque than a drive roller on the second side so that the applied motor torque on each roller is approximately proportional to the length of roller circumference in firm contact with the continuous belt. The method further may include holding the outer end of the inner shaft coaxial to the closer end of the outer shaft by a bearing structure capable of resisting radial loads.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Systems and methods are provided as improvements to belt separator systems and operation of such systems. The systems and methods provided herein may improve or increase belt separator systems through an improved tensioning system. This may allow for optimized operation of the system, and reduced costs associated with operation and time lost due to necessary equipment replacement.

It is to be appreciated that embodiments of the methods and apparatuses discussed herein are not limited in application to the details of construction and the arrangement of components set forth in the following description or illustrated in the accompanying drawings. The methods, systems, and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to embodiments or elements or acts of the systems and methods herein referred to in the singular may also embrace embodiments including a plurality of these elements, and any references in plural to any embodiment or element or act herein may also embrace embodiments including only a single element. Any reference to front and back, left and right, top and bottom, upper and lower, and vertical and horizontal are intended for convenience of description, not to limit the present systems and methods or their components to any one positional or spatial orientation.

The present disclosure is directed to a to an improved tensioning mechanism for a belt-type triboelectric separator system for example, in a triboelectric counter-current belt-type separator system.

Figure 1:
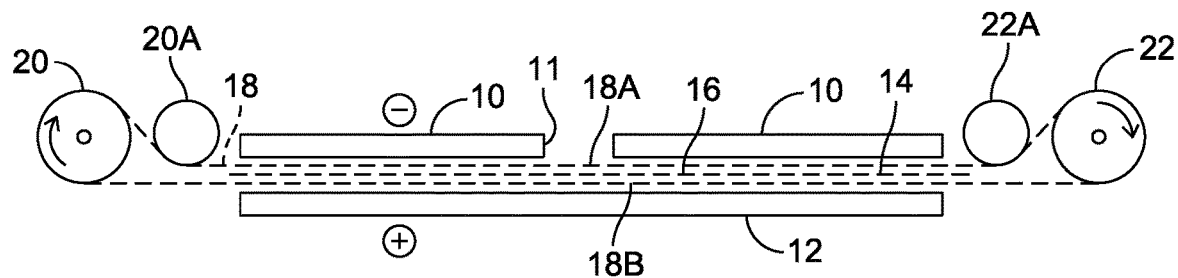
FIG. 1 is a diagram of one example of a known belt separator system (BSS)

As noted above, FIG. 1 shows the embodiment of the BSS with a continuous counter current belt 18 moving between two longitudinal, parallel planar electrodes 10, 12. Belts may be made of various materials. For example, woven belts or extruded belts may be used.

One current design of an ultrahigh molecular weight polyethylene (UHMWPE) belt has straight and smooth machine direction edge strands that are thicker than the machine direction strands or the cross-direction strands in the interior of the belt. These wider (20-30 mm) edge strands serve to carry more of the tension load, provide dimensional stability and reduce the incidence of belt failure by edge abrasion. Such UHMWPE sheet belts have proven to have much longer life than extruded belts. In certain applications, such as the separation of unburned carbon from coal combustion fly ash, these UMHWPE belts have had been tested and shown to have a maximum life of up to 1950 hours before failure.

Figure 3:
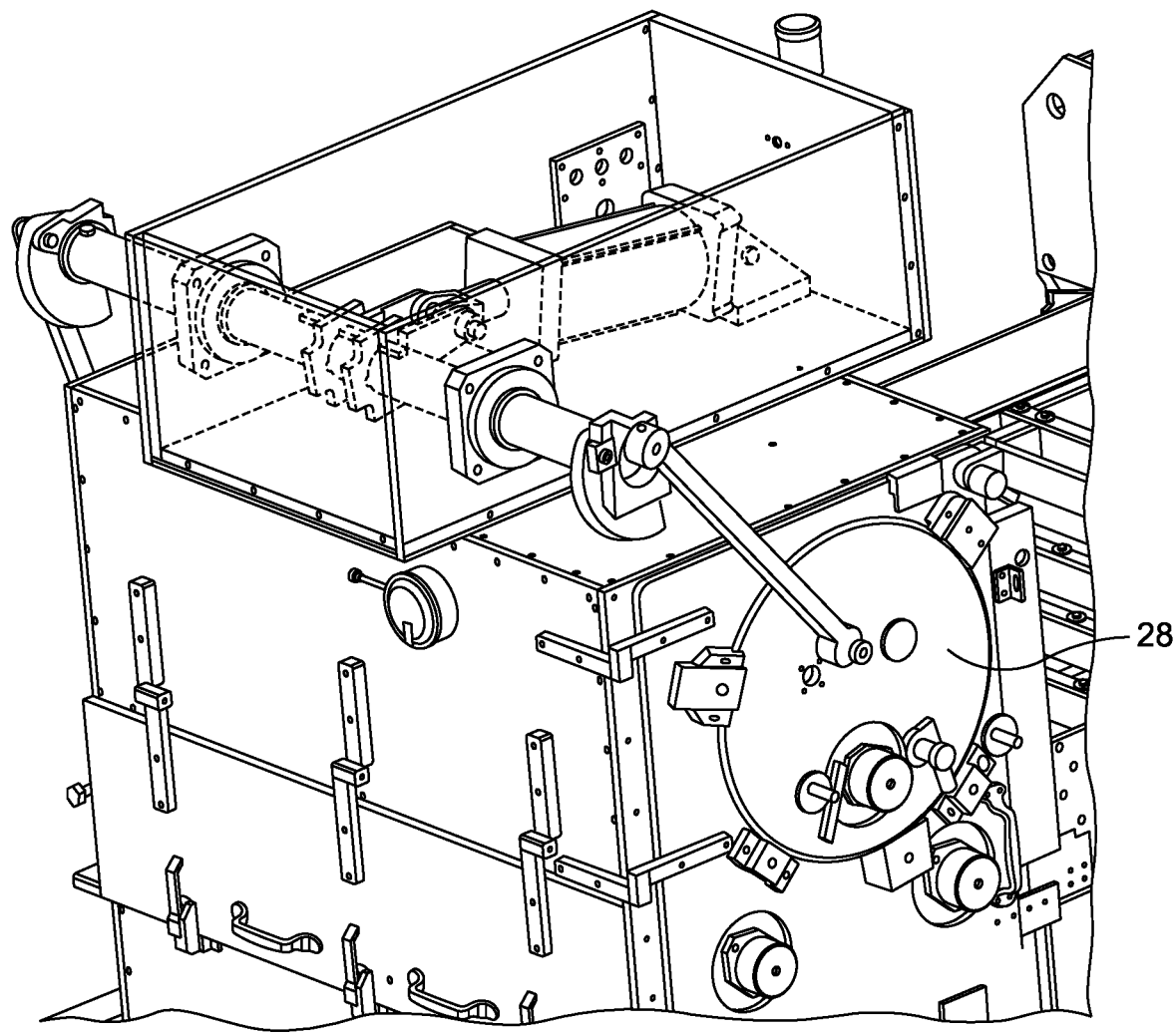
FIG. 3 is a perspective view of an actuator system for the tensioning system shown in FIG. 2.

Embodiments of the present disclosure are directed to a tensioning system that replaces the external shaft and actuator hardware shown in FIG. 3, and instead connects the two rotating disks with a coaxial internal shaft. Due to the high torque and length of the shaft, a regular single shaft of any reasonable dimensions (whether hollow or solid) would twist under the torque load and cause significant deflections and tension roller misalignment if a single actuator was used on one end of the shaft. Embodiments of the present disclosure solve this problem by using a hollow shaft with a secondary internal shaft.

Figure 4:
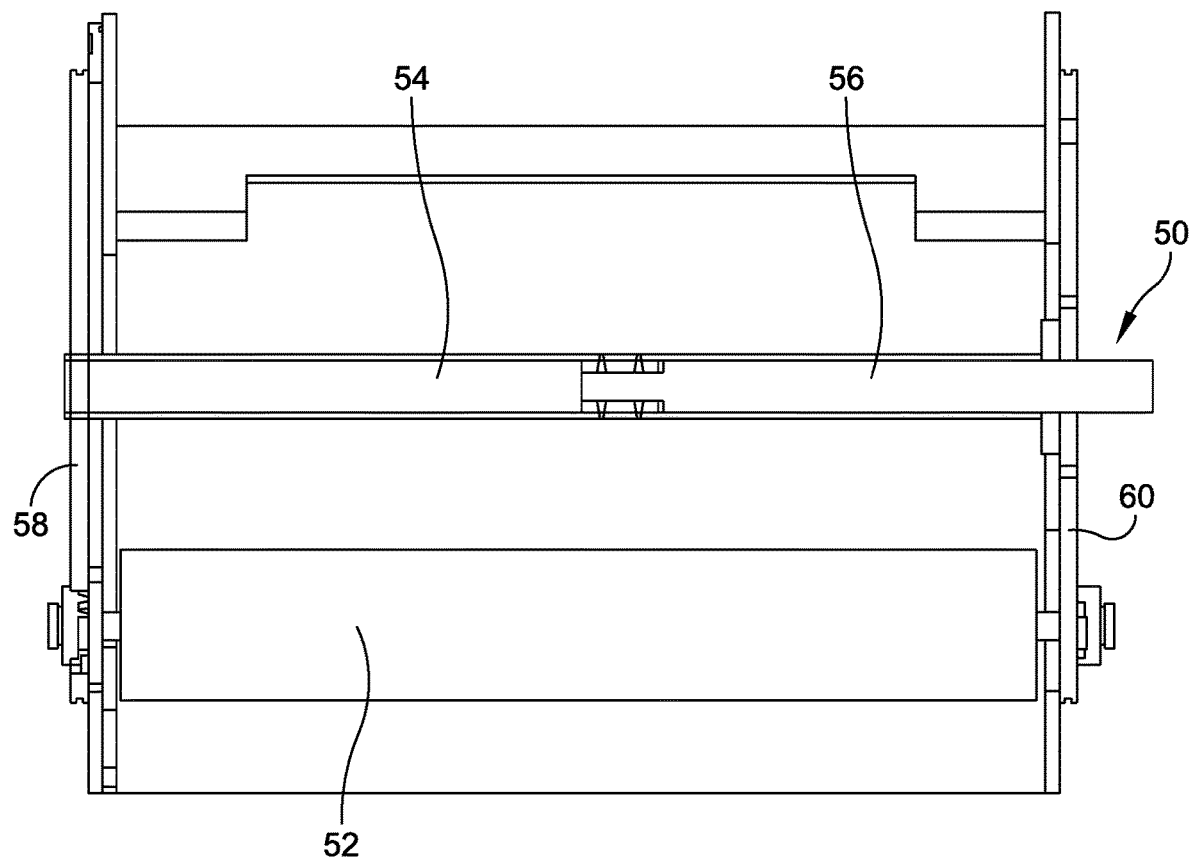
FIG. 4 is a cross-sectional view of a tensioning system of an embodiment of the present disclosure.

Referring to FIG. 4, the tensioning mechanism, generally indicated at 50, includes a tension roller 52 coupled to a rotating shaft assembly including a hollow outer shaft 54 and an inner shaft 56. The tension roller 52 and the rotating shaft assembly are coupled to a pair of rotating disks 58, 60 mounted on outer ends of the tension roller. Specifically, the outer shaft 54 and the inner shaft 56 of the rotating shaft assembly are mounted along a centerline of the rotating disks 58, 60, with the tension roller 52 being mounted off-axis with respect to the rotating disks.

Figure 5:
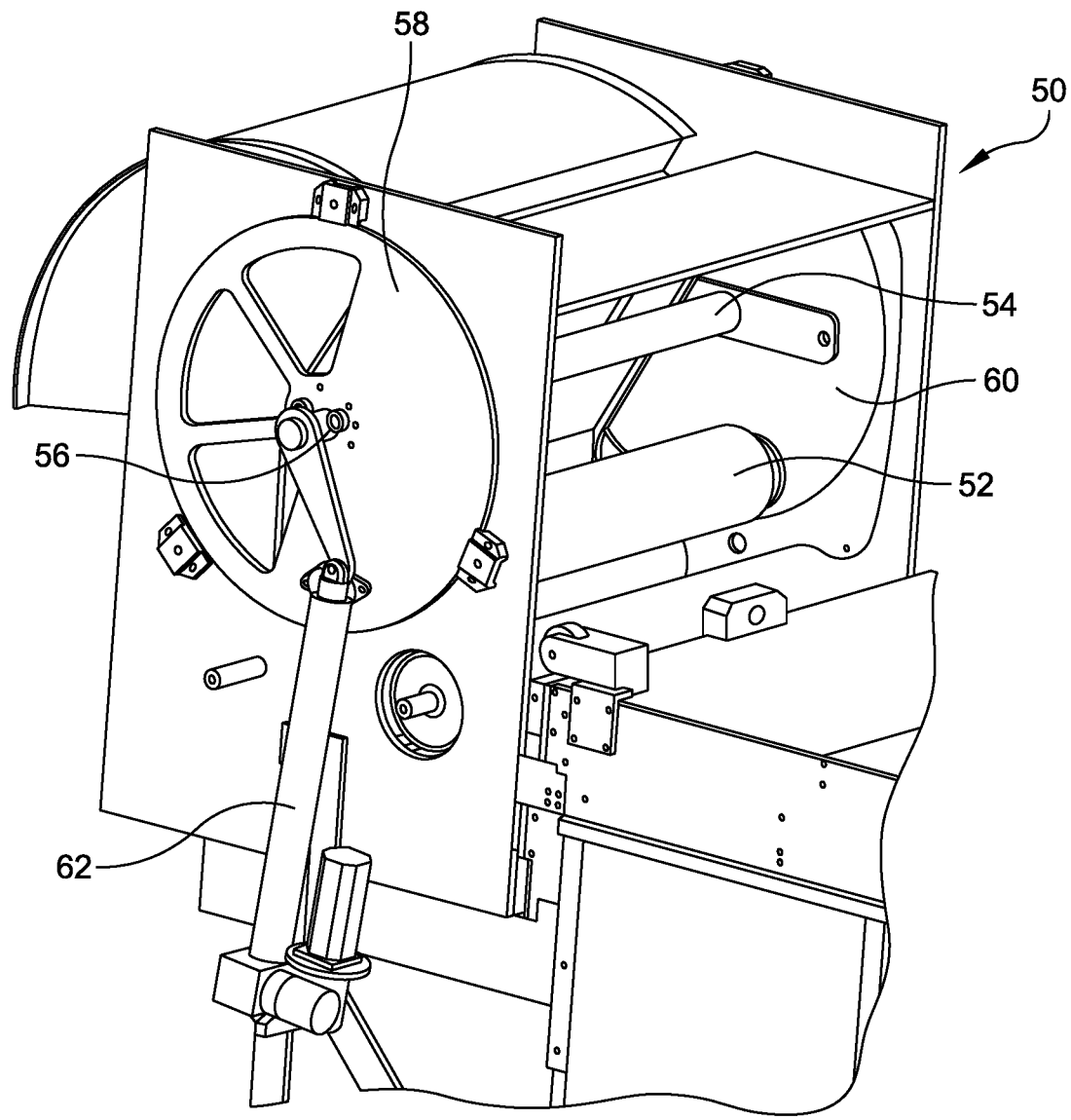
FIG. 5 is a perspective view of components of the tensioning system shown in FIG. 4.
Figure 6:
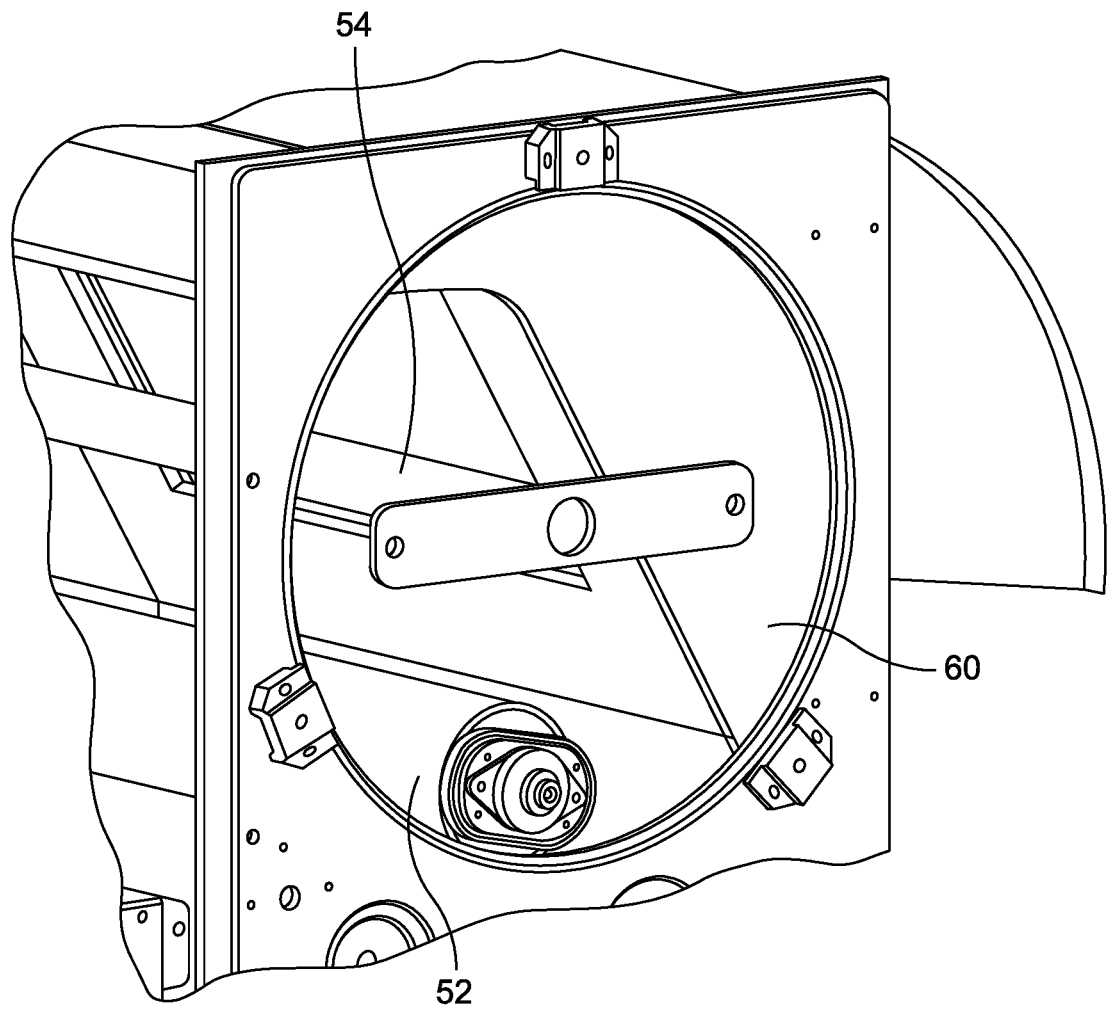
FIG. 6 is another perspective view of components of the tensioning system shown in FIG. 4.
Figure 7:
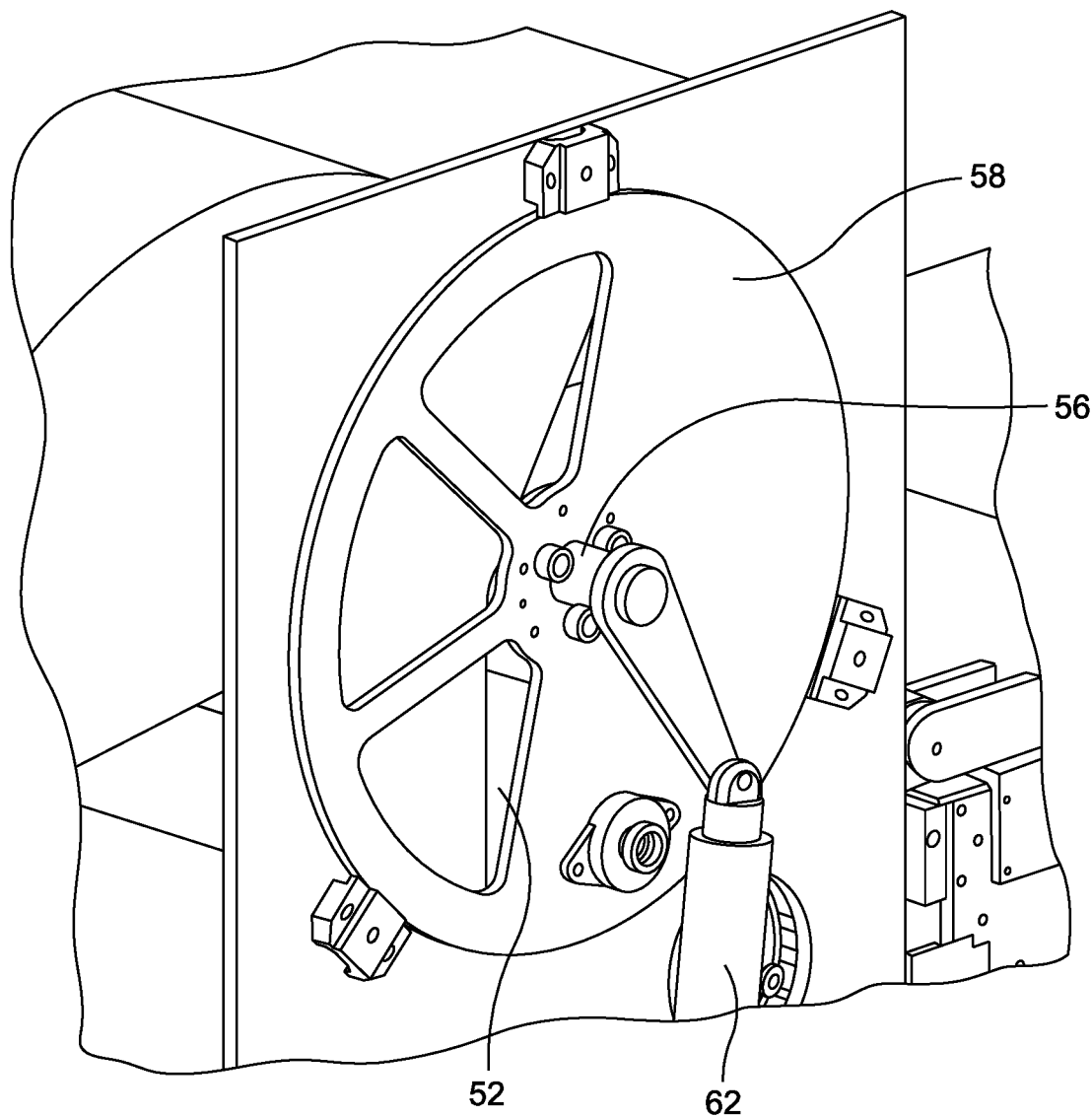
FIG. 7 is another perspective view of components of the tensioning system shown in FIG. 4.

As shown, the inner shaft 56 can twist independently of the outer shaft 54 in such a manner that the twisting of the inner shaft does not cause a difference in angular deflection of the two rotating disks 58, 60 which carry the tension roller 52. The hollow outer shaft 54 will also experience twist deflection, but a cross-section of the outer shaft and attachment to the inner shaft 56 is sized and positioned so that both rotating disks 58, 60 experience equal angular deflection under equal loads, relative to the inner shaft. The tensioning system allows the outer end of the inner shaft (on the right in FIG. 4) to be turned by a single actuator. In one embodiment, with reference to FIG. 5, an air piston 62 is provided to actuate the rotating disk 58 to drive the rotation of the other rotating disk via the outer and inner shafts 54, 56. Any type of drive mechanism can be provided in place of air piston 62, e.g., an electrical screw drive or some other type of drive. Since the two rotating disks 58, 60 have the same rotational stiffness relative to the actuating shaft (i.e., the rotating shaft assembly), the tension roller 52 will not be misaligned under a well-centered belt load on the tension roller.

Figure 2:
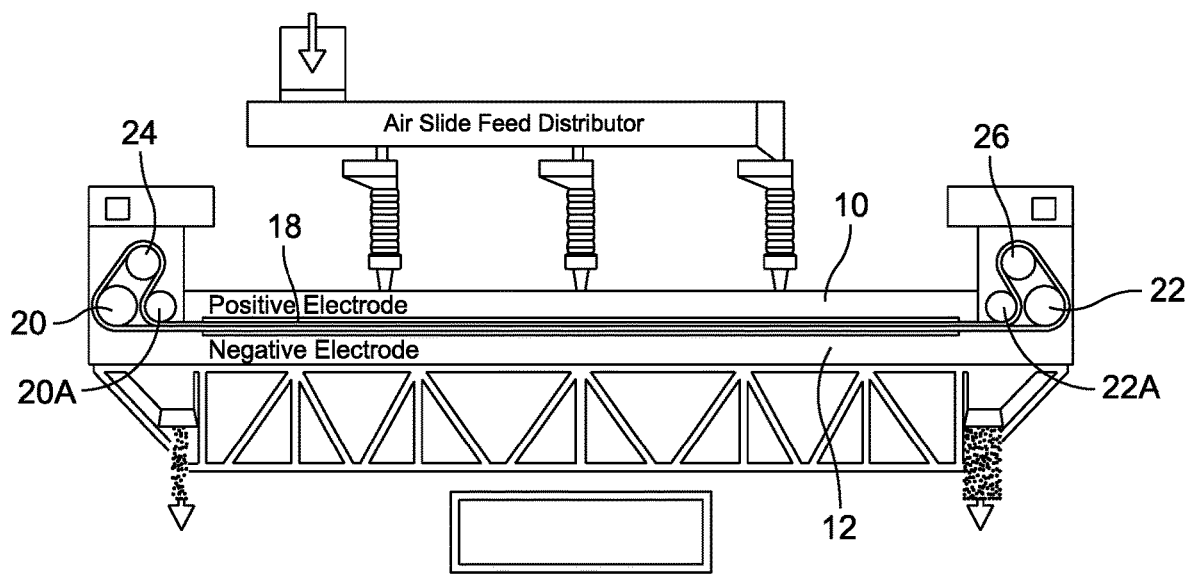
FIG. 2 is a side elevational view of tensioning system of a known BSS.

Embodiments of the tensioning system 50 of the present disclosure allow a desired 40" of belt elongation to be accommodated with a single tension mechanism. So, instead of six rollers, the belt loop can use just five. One side of the tensioning system 50 includes two rollers as shown on the left in FIG. 1, e.g., rollers 20A, 20B, while the other side of the tensioning system includes three rollers as shown in FIG. 2, e.g., rollers 22, 22A, 26. Thus, significant cost savings are achieved from the implementation of the tensioning system due to the elimination of the elaborate shaft and arm mechanism shown in FIG. 3, despite the rotary disk on the three-roller side being enlarged from approximately 20 inches in diameter to 33 inches in diameter.

The two-roller arrangement used on one side provides better belt contact and can be used to either reduce the chance of belt slippage or reduce belt tension. The contact area is increased from approximately 120 degrees to 210 degrees of roller circumference angle over the existing three-roller design. Reduced need for belt tension can allow improved belt designs, longer belt life or a combination of both.

In one embodiment, the rotating disks 58, 60 are held coaxial to the rotating shaft assembly (outer shaft 54 and inner shaft 56) by bearings on perimeters of the pair of rotating disks.

In one embodiment, one of the rotating disks, e.g., disk 60, can be detached from both the tension roller 52 and the rotating shaft assembly (outer shaft 54 and inner shaft 56), and moved away so the belt 18 can be removed off the tension roller and other rollers defining a belt loop without removing the belt rollers. The rotating shaft assembly (outer shaft 54 and inner shaft 56) serves as parts of an enclosure, with the rotating shaft assembly being locked to both rotating disks during belt operation, such that the rotating shaft assembly holds the rotating disks together in the event of an explosion inside the enclosure or other event which generates separating axial forces on the rotating members.

In one embodiment, one set of two rollers does not include a tension roller and the other set of two rollers includes a tension roller. A drive roller on a two-roller side is operated at substantially greater applied motor torque than a drive roller on a three-roller side so that the applied motor torque on each roller is approximately proportional to the length of roller circumference in firm contact with the belt.

In one embodiment, the outer end of the inner shaft 56 is held coaxial to the closer end of the outer shaft 54 by a bearing structure capable of resisting radial loads. The bearing structure consists of three or more cam followers.

For food/feed applications which use nitrogen purging for oxygen suppression, the tensioning system consumes significantly less nitrogen. That is because the gaps between the drive box walls and the rotating disks form the main inflow of gas into the drive boxes, and that the shown embodiment need only to flood these gaps with nitrogen on one drive box instead of two. Despite the larger rotary disks used on the tensioning system, an approximately 15% reduction in $N_2$ demand is expected to be achieved.

The volume of the drive box on the two-roller side is reduced compared to the existing three-roller design, which reduces the volume of air which needs to be vented in the event of an internal explosion of combustible dust/gas mixtures. This is beneficial for food/feed applications where one output stream is expected to pose a higher risk of explosion than the other, in which case the higher risk output product would be sent to the two-roller side.

When a tension roller is a belt loop is moved to generate tension in the belt, it is important that the forces from the belt do not cause deflections in the axial alignment of the tension roller relative to the belt loop. To achieve this, the ends of the tension roller should ideally be held with a mechanism which deflects the same way on both roller ends due to forces from the belt. Embodiments of the tensioning system disclosed herein solve this problem by using a composite shaft structure, which allows using actuation from one side of the tension roller while maintaining equal deflection of both tension roller ends.

In other embodiments, instead of containing two rotating disks, the mechanism can have two arms mounted to the outer rotating shaft. Each arm is connected to one end of the tension roller so that both arms experience the same angular deflection as defined by a plane through the center of the tension roller at the end of the arm and the axis of the outer rotating shaft is under equal loads from the tension roller relative to the inner shaft. The outer rotating shaft is held by bearings on both ends, which constrain lateral motion but allow rotation of the outer rotating shaft on its axis. In a certain embodiment, one arm can be detached from the tension roller so that the continuous belt can be removed from the tension roller without removing the tension roller.

Having thus described certain embodiments of a belt separator system comprising a tensioning system, methods of operating the same, and methods of facilitating an operating life of a belt separation system, various alterations, modifications and improvements will be apparent to those of ordinary skill in the art. Such alterations, variations and improvements are intended to be within the spirit and scope of the application. Accordingly, the foregoing description is by way of example and is not intended to be limiting. The application is limited only as defined in the following claims and the equivalents thereto.

The invention claimed is:

1. A tensioning mechanism to tension an endless belt, the tensioning mechanism comprising:
   a tension roller configured to apply tension to a belt;
   a pair of rotating disks coupled to the tension roller at respective ends of the tension roller, the pair of rotating disks being configured to move the tension roller to apply tension to the belt; and
   a rotating shaft assembly coupled to the pair of rotating disks, the rotating shaft assembly including an inner shaft coupled to an outer shaft, the inner shaft being rotated with an actuator, the outer shaft being sized to receive the inner shaft therein and is coupled to the pair of rotating disks, the rotating shaft assembly being configured so both rotating disks of the pair of rotating disks experience approximately the same angular deflection relative to the outer end of the inner shaft when each disk exerts an amount of torque on the rotating shaft assembly against the torque exerted by an actuator on the inner shaft, wherein the tensioning mechanism is included within a belt separator system comprising a first set of two rollers at a first end of the belt separator system and a second set of two rollers at a second end of the belt separator system, wherein at least one of the first set of two rollers and the second set of two rollers includes a tension roller.

2. The tensioning mechanism of claim 1, wherein the pair of rotating disks are held coaxial to the rotating shaft assembly.

3. The tensioning mechanism of claim 1, wherein the pair of rotating disks serve as part of an enclosure, wherein the rotating shaft assembly is locked to the pair of rotating disks during belt operation, such that the rotating shaft assembly holds the pair of rotating disks together in the event of an explosion inside the enclosure or other event which generates separating axial forces on the rotating members.

4. The tensioning mechanism of claim 1, wherein a drive roller on the first side is operated at substantially greater applied motor torque than a drive roller on second side so that the applied motor torque on each roller is approximately proportional to the length of roller circumference in firm contact with the belt.

5. The tensioning mechanism of claim 1, wherein the outer end of the inner shaft is held coaxial to the closer end of the outer shaft.

6. A belt separator system comprising:
a first electrode and a second electrode arranged on opposite sides of a longitudinal centerline and configured to provide an electric field between the first and second electrodes;
a first set of rollers disposed at a first end of the system;
a second set of rollers disposed at a second end of the system;
a continuous belt disposed between the first and second electrodes and supported by the first set of rollers and the second set of rollers;
a separation zone defined by and between the continuous belt; and
a tensioning mechanism to tension the continuous belt, the tensioning mechanism including
a tension roller configured to apply tension to the continuous belt,
a pair of rotating disks coupled to the tension roller at respective ends of the tension roller, the pair of rotating disks being configured to move the tension roller to apply tension to the continuous belt, and
a rotating shaft assembly coupled to the pair of rotating disks, the rotating shaft assembly including an inner shaft coupled to an outer shaft, the inner shaft being rotated with an actuator, the outer shaft being sized to receive the inner shaft therein and is coupled to the pair of rotating disks, the rotating shaft assembly being configured so both rotating disks of the pair of rotating disks experience approximately the same angular deflection relative to the outer end of the inner shaft when each disk exerts equal amount of torque on the rotating shaft assembly against the opposing torque exerted by an actuator on the inner shaft.

7. The belt separator system of claim 6, wherein the pair of rotating disks are held coaxial to the rotating shaft assembly.

8. The belt separator system of claim 6, wherein the pair of rotating disks serve as part of an enclosure, wherein the rotating shaft assembly is locked to the pair of rotating disks during operation, such that the rotating shaft assembly holds the pair of rotating disks together in the event of an explosion inside the enclosure or other event which generates separating axial forces on the rotating members.

9. The belt separator system of claim 6, wherein a drive roller on the first side is operated at substantially greater applied motor torque than a drive roller on the second side so that the applied motor torque on each roller is approximately proportional to the length of roller circumference in firm contact with the continuous belt.

10. The belt separator system of claim 6, wherein the outer end of the inner shaft is held coaxial to the closer end of the outer shaft.

11. A method of separating a particle mixture within a belt separator system, the method comprising:
introducing the particle mixture to a feed port of the belt separator system, the system comprising:
a first electrode and a second electrode arranged on opposite sides of a longitudinal centerline and configured to provide an electric field between the first and second electrodes,
a first set of rollers disposed at a first end of the system,
a second set of rollers disposed at a second end of the system,
a continuous belt disposed between the first and second electrodes and supported by the first set of rollers and the second set of rollers,
a separation zone defined by and between the continuous belt, and
a tensioning mechanism to tension the continuous belt, the tensioning mechanism including
a tension roller configured to apply tension to the continuous belt,
a pair of rotating disks coupled to the tension roller at respective ends of the tension roller, the pair of rotating disks being configured to move the tension roller to apply tension to the continuous belt, and
a rotating shaft assembly coupled to the pair of rotating disks, the rotating shaft assembly including an inner shaft coupled to an outer shaft, the inner shaft being rotated with an actuator, the outer shaft being sized to receive the inner shaft therein and is coupled to the pair of rotating disks, the rotating shaft assembly being configured so both rotating disks of the pair of rotating disks experience approximately the same angular deflection relative to the outer end of the inner shaft when each disk exerts equal amount of torque on the rotating shaft assembly against the opposing torque exerted by an actuator on the inner shaft;
providing a separation influence to at least one of the first electrode and the second electrode;
separating different components of the particle mixture in the direction of the separation influence according to their relative influenceability to the separation influence;
mechanically moving the different components of the particle mixture transversely to the separation influence; and
removing the separated components from said separation chamber.

12. The method of claim 11, further comprising holding the pair of rotating disks coaxial to the rotating shaft assembly.

13. The method of claim 11, further comprising locking the rotating shaft assembly to the pair of rotating disks during operation, such that the rotating shaft assembly holds the pair of rotating disks together in the event of an explosion inside the enclosure or other event which generates separating axial forces on the rotating members.

14. The method of claim 11, further comprising providing the second set of two rollers with the tension roller.

15. The method of claim 14, further comprising operating a drive roller on the first side at substantially greater applied motor torque than a drive roller on the second side so that the applied motor torque on each roller is approximately proportional to the length of roller circumference in firm contact with the continuous belt.

16. The method of claim 11, further comprising holding the outer end of the inner shaft coaxial to the closer end of the outer shaft.

* * * * *